United States Patent [19]
Kuperman et al.

[11] Patent Number: 4,591,998
[45] Date of Patent: May 27, 1986

[54] DYNAMIC BAR PATTERN METHOD

[75] Inventors: Gilbert G. Kuperman; Donald L. Wallquist, both of Dayton, Ohio

[73] Assignee: The United States of America as represented by the Secretary of the Air Force, Washington, D.C.

[21] Appl. No.: 556,861

[22] Filed: Dec. 1, 1983

[51] Int. Cl.$^4$ .................. G06F 3/153; G06F 15/66
[52] U.S. Cl. .................... 364/521; 340/706; 340/720; 340/723; 364/518
[58] Field of Search ............. 364/514, 518, 521, 900; 340/700, 703, 706, 720, 723; 351/239, 243

[56] References Cited

U.S. PATENT DOCUMENTS

| | | | |
|---|---|---|---|
| Re. 31,200 | 4/1983 | Sukonick et al. ................. | 364/900 |
| 4,070,662 | 1/1978 | Narveson ........................ | 340/726 |
| 4,070,710 | 1/1978 | Sukonick ........................ | 364/900 |
| 4,119,956 | 10/1978 | Murray .......................... | 340/703 |
| 4,200,869 | 4/1980 | Murayama et al. ................ | 340/723 |
| 4,239,351 | 12/1980 | Williams et al. ................. | 364/521 X |
| 4,293,200 | 10/1981 | Dobson et al. ................... | 351/239 X |
| 4,365,873 | 12/1982 | Ginsburg ........................ | 351/239 |
| 4,370,733 | 1/1983 | Gaudio .......................... | 364/900 |
| 4,511,228 | 4/1985 | von Gierke et al. ............... | 351/243 |

OTHER PUBLICATIONS

AFAMRL-TR-80-121, "Proposed New Vision Standards for the 1980's and Beyond: Contrast Sensitivity", A. P. Ginsburg, Sep. 81, (21 pages).

*Primary Examiner*—Felix D. Gruber
*Attorney, Agent, or Firm*—Donald J. Singer; Gerald B. Hollins

[57] ABSTRACT

Digital apparatus for generating moving grates of stimulus modulated bar patterns is disclosed. The bar patterns are modulated according to sinusoidal or other mathematical relations and can be alternately displayed as color and/or intensity variations on the display screen. Multiple display images, operator control of grate movement, and the use of image processing apparatus are also incorporated.

12 Claims, 5 Drawing Figures

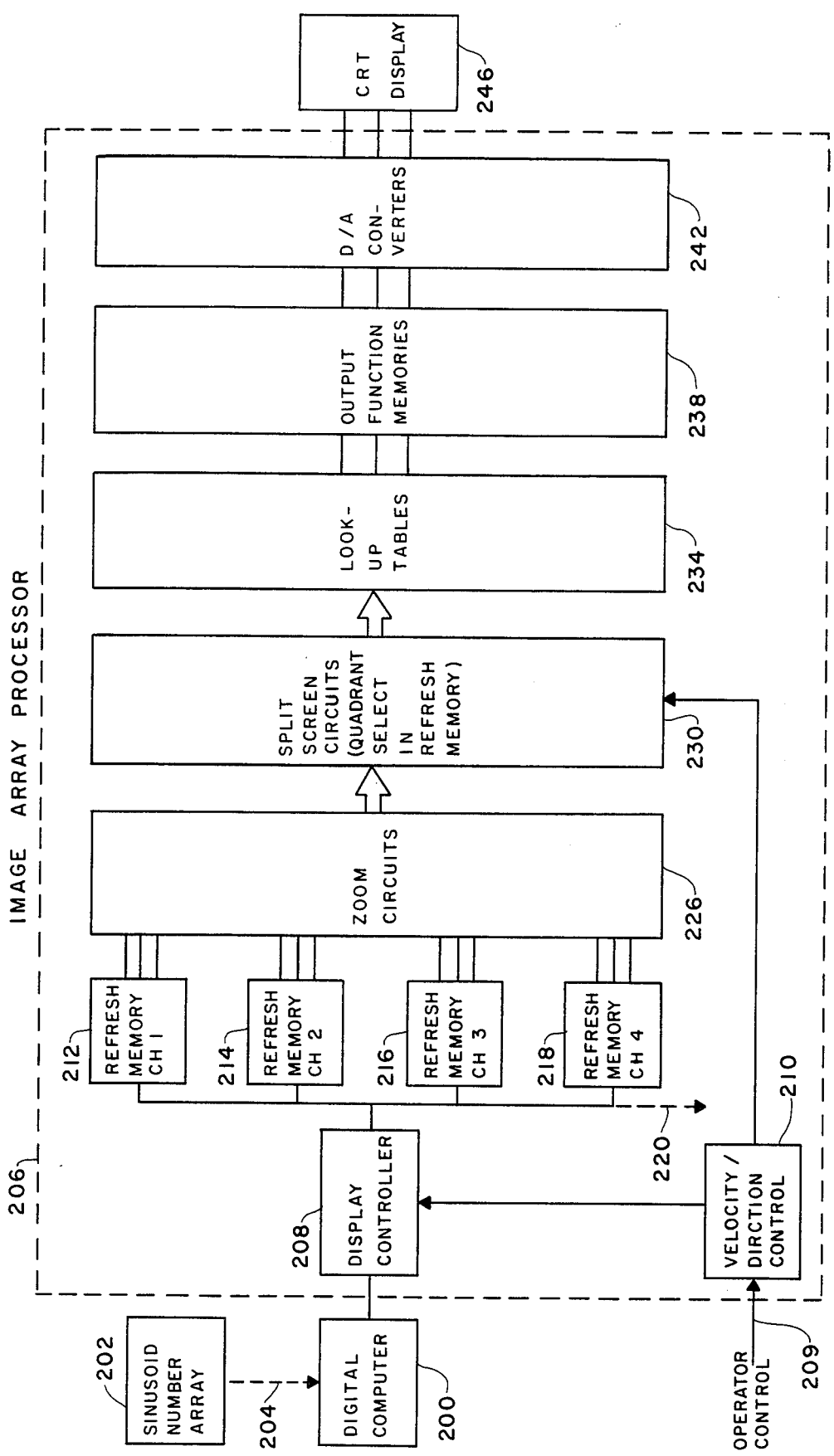

DYNAMIC BAR PATTERN METHOD

RIGHTS OF THE GOVERNMENT

The invention described herein may be manufactured and used by or for the Government of the United States for all governmental purposes without the payment of any royalty.

BACKGROUND OF THE INVENTION

The invention relates to the generation of visually displayed repetitive patterns which may be used in the fields of visual, biological and psychological testing and in visual displays such as animated displays.

Bar patterns or gratings in particular have found increased acceptance in the field of visual testing since first proposed by O. H. Schade, in the article "Optical and Photoelectric Analog of the Eye" published in the Journal of the Optical Society of America, Vol. 46, pages 721–739 (1956). The December 1981 report "Proposed New Vision Standards for the 1980's and Beyond: Contrast Sensitivity", by Major Arthur Ginsburg of the Air Force Aeromedical Research Laboratory, for example, describes current state-of-the-art visual testing and contains several references to articles involving the use of sinusoid gratings.

The Ginsburg report also shows at page 7 several examples of sinusoid gratings which could have been generated using the present invention and shows a possible relation of these examples to aircraft pilot visual needs by way of a series of contrast varied photographs.

The Ginsburg report is published by the Air Force Aerospace Medical Research Laboratory of the Aerospace Medical Division of the Air Force Systems Command at Wright-Patterson AFB, Ohio 45433. This report received the technical review and approval identified as AFAMRL-TR-80-121. Copies of the report may be purchased from the National Technical Information Service at 5285 Port Royal Road, Springfield, VA 22161 or, for use by Federal Government agencies and their contractors from the Defence Documentation Center, Cameron Station, Alexandria, VA 22314.

The Ginsburg report also shows, on page 10, a correlation between sinusoidal gratings of various frequency and subtended visual angle and the information needed by a human subject to recognize two alphabet letters commonly used in the Snellen visual acuity measurement chart. As is pointed out by Major Ginsburg, many of the past practices in visual measurement have been notably lacking in completeness in areas addressed by the sinusoids or other bar patterns generated with the present invention.

Sinusoidal intensity gratings have also been found useful in the field of psycological testing where a tested subject's response to confusion, frustration, blurred images, and discomforting image movement are evaluated.

The patent art contains examples of electrically generated patterns; this art includes the U.S. Pat. No. 4,707,710 of J. S. Sukonick which discloses a raster scan computer graphic apparatus that includes split screen and zoom display features and permits the display of information stored in a memory. The Sukonick patent also teaches the display of multiple images of the same object at different magnification, the incorporation of alpha/numeric messages in the display and the ability to move portions of an image to a new display location. FIG. 2d of the Sukonick patent shows a greatly magnified image of a bar-like pattern together with the related video signal—which indicates the displayed bars are intended to be trapezoidal or square wave in nature.

The patent of P. M. Murray U.S. Pat. No. 4,119,956 shows a raster scan display apparatus for computer generated images in which the displayed image is filtered or smoothed according to the sum of the video signals for each line. This smoothing achieves an image having graded intensity changes that are more nearly analog in nature than would result from digital processing systems.

The U.S. Pat. No. 4,370,733 of J. J. Gaudio, shows a display apparatus wherein the displayed signal is developed from the summation of two preexisting display signals. The intensity of the displayed signal in the Gaudio patent is controlled by way of predetermined fractions of the periodic waveform which energizes the display. The preferred embodiment of the Gaudio invention employs electric lamp bulbs of three complementing colors to compose an element of the displayed image.

The U.S. Pat. No. 4,225,861 of G. G. Langdon et al, discloses an apparatus and method for artificially supplying texture or roughness to a displayed image by changing the color composition of the image using image processing apparatus.

The U.S. Pat. No. 4,200,869 of Murayama et al, discloses a digital display apparatus employing refresh memory storage of the displayed information and disclosing the ability to shift a displayed image. The Murayama et al apparatus contemplates the use of a display control bit to determine whether particular memory words are to be displayed on the screen. Murayama et al also contemplate the scrolling up or down of a displayed image at a controllable scrolling rate determined by hardware or an external instruction.

The above mentioned Arthur Ginsburg also has a U.S. Pat. No. 4,365,873 for a "Spatial Frequency and Contrast Sensitivity Test Chart", this document relates to the above mentioned AFAMRL-TR-80-121 report concerning vision standards. The Ginsburg patent includes a figure showing examples of sinewave gratings with low, medium and high spatial frequencies at low and high contrast and also includes definitions of spatial frequency and contrast. The Ginsburg patent and report are hereby incorporated by reference herein.

Two other Department of the Air Force employees, Henning E. von Gierke and Adolf R. Marko also have a U.S. Pat. No. 4,511,228, which employs sinusoidal gratings in an apparatus and method for testing visual sensitivity of human subjects. The von Gierke and Marko document includes an extensive discussion of the prior art in visual sensitivity measurement including a citation of several publications and patents. The disclosure of the von Gierke and Marko application is also incorporated herein by reference.

Several publications relating to the image array processor used in the preferred embodiment of the invention are listed in the detailed description section below, these references are also considered to be of interest as prior art.

SUMMARY OF THE INVENTION

The present invention provides a mathematically precise and flexible arrangement for generating grating bar patterns that are continuously position movable at a velocity responsive to operator control. The patterns are generated from computer memory stored visual stimulus determining values and moved in physical location by using incrementally phase-displaced additional computer stored values—all accessed at operator controlled rates. The patterns may be of sinusoidal visual stimulus variation or of other mathematically defined stimulus function variation. Color stimulus attributes such as hue, saturation, and brightness as well as monochromatic intensity may be defined by the visual stimulus values. The invention includes capability for generating grating patterns of plural bar frequency, velocity, and direction all on the same display. Computer controlled image processing equipment is used to embody the invention along with a cathode ray tube display; other embodiment arrangements are, of course, feasible.

An object of the present invention is therefore to develop moveable grates of intensity modulated visual patterns which are highly stable and repeatable through the use of digital generating techniques.

Another object of the invention is the provision of a display which is usable in the fields of visual testing, psychological testing, and for training operators or visual analysts.

Another object of the invention is the provision of a display which can incorporate a large variety of color, intensity, movement velocity, visual angle, and spatial distribution characteristics.

Another object of the invention is to provide apparatus which can develop periodic waveforms having intensity modulation that can conform to a variety of mathematical patterns such as a sinusoid, a saw tooth or triangular wave, a trapezoidal waveform, impulse waveforms or complex waveforms which may be resolved into a number of sinusoidal components of varying frequency and phase relationship.

A notable feature of the invention is the ease with which apparatus imperfections such as intensity fall off near the edges of a display screen can be accommodated through modification of stored digital information.

BRIEF DESCRIPTION OF THE DRAWINGS

FIG. 1 including the views

FIG. 2 is a block diagram of apparatus used in the preferred embodiment of the invention.

DETAILED DESCRIPTION

Figure 1A:
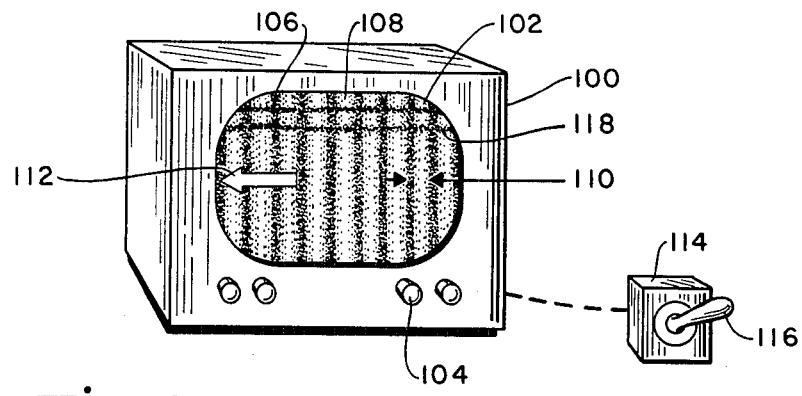
FIGS. 1A, 1B and 1C, shows a variety of grating patterns generated in accordance with the invention.

FIG. 1 in the drawings shows three examples of bar pattern gratings generated in accordance with the present invention. The patterns in FIG. 1 are illustrated as being of sinusoidal luminous intensity variation and are referred to herein variously as sinusoidal bars, a sinusoidal grating or as a bar pattern; it being understood, of course, that the term sinusoidal is exemplary and not limiting and that intensity variations other than sinusoidal could be achieved with the invention.

FIG. 1A illustrates the appearance of a sinuoidal grating generated by the preferred embodiment apparatus as it would be observed by a testing subject or an operator. In FIG. 1A the display 100 is shown to include a viewing screen 102 illuminated by a series of raster scanning lines 118 which are intensity modulated according to the amplitudes of a sinewave to produce bright areas, as indicated at 108, and dark areas, as indicated at 106. The pattern of FIG. 1A is shown to have a spacing or spatial frequency as indicated by the space 110 and a movement velocity across the screen, as indicated by the arrow 112. The FIG. 1A apparatus further includes an operator's control 114 which incorporates a joy stick control 116. The joy stick 116 is arranged to control the velocity and direction of grating movement indicated by the arrow 112 by modifying a control signal input 209 to the velocity direction control 210 in FIG. 2. The display of FIG. 1A further includes a plurality of operator adjustable controls indicated at 104 for controlling display brightness, contrast, power on and off and other state-of-the-art parameters such as election of a positive or negative image for display.

Figure 1D:
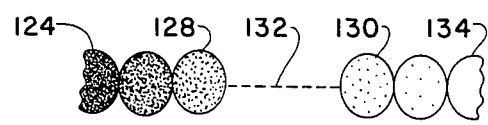
FIG. 1D shows an expanded view of a portion of one of these grating patterns.

The manner in which the image of FIG. 1A is actually fabricated by the apparatus of the preferred embodiment is shown in FIG. 1D of the drawings. Six pixels which could comprise a portion of FIG. 1A are shown in expanded form in FIG. 1D; these pixels range from a portion of a darkest pixel 124 to a portion of a lighter pixel 134. Intermediate intensity pixels are shown at 128 and 130 in FIG. 1D and the possible presence of pixels of more intermediate intensity is indicated by the dotted line 132. The model 70E processor used in the preferred embodiment has the capability of generating pixels of 256 different intensity levels or alternately of 256 different color variations even though the numeric value arrays of the preferred embodiment may not require this degree of resolution.

The preferred embodiment apparatus for generating the grating of FIG. 1 is shown in FIG. 2 of the drawings. The FIG. 2 apparatus includes a digital computer 200, image array processing apparatus 206, and a viewable display 246, the display 246 being of the familiar cathode ray tube and raster scanned image type and corresponding to the display 100 in FIG. 1. The digital computer 200 is intended to receive, process, and send out, a sinusoid number array which is developed in a manner described below. This array is loaded into the computer's memory as indicated by the line 204 for subsequent transfer to the refresh memories 212–218 which are part of the image array processor 206. The computer 200 serves primarily in a host, house-keeping controller and communications role in the FIG. 2 apparatus. The numerical value arrays which determine the patterns observed on the display 246 pass through the computer 200 and receive temporary storage and rearrangement as needed but are then stored in the refresh memories 212–218 for actual use by the display. Special purpose or dedicated digital hardware could be used to replace the computer 200 and the image array processor 206 in alternate embodiments of the invention as is described below.

The digital computer 200 may be a Digital Equipment Corporation Model PDP 11/34 computer or one of many equivalent computers. The image array processor 206 may be a model 70E image array processor manufactured by International Imaging Systems Incorporated, of 1500 Buckeye Drive, Milpitas, CA 95035, or equivalent image processing equipment which is manufactured by a number of suppliers. The image array processor 206 is herein referred to as the I₂S processor.

The model 70E I²S processor is described in several publications which are listed below for both the purpose of incorporation by reference and as indicated in the background of the invention for consideration as prior art. These publications are as follows:

"Application of Digital Image Processing Techniques and Hardware to Regional Growth Modeling" by Ted Driscoll, published in the proceedings of the American Society of Photogrametry, Vol. 1., 45th annual meeting, Mar. 18–24, 1979, Washington, D.C. The bibliography and technical appendix of this article concerning the model 70E processor are also of interest.

"A Low Cost Color Portable Image Processing System" by John R. Adams and Edward C. Driscoll, presented at the first ASSP Workshop on two-dimensional digital signal processing, Oct. 3–4, 1979, Lawrence Hall of Science, Berkeley, CA.

"High Speed Hardware Classification of Multispectral Imagery Implemented in a General Purpose Image Display" by Edward C. Driscoll, Jr., of International Imaging Systems Incorporated, published in the Journal of Applied Photographic Engineering, Vol. 8, No. 3, June 1982.

"Evolution of Image Processing Algorithms from software to Hardware" by Ted Driscoll and Chris Walker of International Imaging Systems Incorporated, published in the Proceedings of the Society of Photooptical Instrumentation Engineers, Paper No. 17, Vol. 271, February 1981.

"New Concepts in Display Technology" by John Adams and Robert Wallis, published in Computer Magazine, August 1977, page 61–69.

The International Imaging System Corporation has manufactured a series of image array processors related to the model 70E processor used in the preferred embodiment of the invention. This series includes a model 70CF, the model 70E, a model 70F4, a model 70F12, a model 71A and the currently sold model 75. These models have evolved largely in response to the availability of larger random access memory chips from the integrated circuit art.

Additional description of the 70E image array processor and an application of this processor to a different field of invention is found in the present applicant's copending U.S. patent application, Ser. No. 06/547,610, filed Nov. 1, 1983, now U.S. Pat. No. 4,558,359, titled "Anaglyphic Stereoscopic Image Apparatus and Method", which is hereby incorporated by reference.

Four channels of image processor refresh memory, each capable of storing 512×512, eight-bit words of pixel information are used in embodying the present invention; each channel of refresh memory therefore is capable of storing 8×262,144 bits of information. This available memory is also in effect expanded by the use of zoom circuits which are indicated at 226 in FIG. 2 in the preferred embodiment of the invention. Embodiments of the invention which do not require the quantity of memory available in the I²S Model 70E processor can be achieved by eliminating redundant information in memory storage and reusing basic sinusoid segment data as is indicated below. In the preferred embodiment of the invention, the model 70E memory makes such memory conservation unnecessary and uneconomical.

The portion of the I²S image array processor which are associated with the present embodiment include four channels of refresh memory 212–218, a display controller 208, a velocity direction control 210, the zoom circuits 226, the split screen circuits 230, lookup table memories 234, the output function memories 238 and the digital-to-analog converters 242. Each of these components can be readily recognized in a functional block diagram of the model 70E I²S processor which is shown, for example, in FIG. 1 of the Driscoll and Walker published article.

Certain portions of the model 70E processor apparatus are not required in the embodiment of the present invention and are shown in FIG. 2 only to clarify the correspondence between FIG. 2 and the published discriptions of the model 70E processor. This is notably true of the lookup tables 234 and the output function memories 238 which are programmed with one-to-one correspondence information and provide no change between their respective input and output signals.

In the preferred embodiment of the invention arrays of numerical values representing periodic amplitude samples of a plurality of phase displaced sinusoids are computed off-line and loaded into the digital computer 200, as is indicated at 204. Subsequently these arrays are transferred to the refresh memories 212–218 where they can be accessed to provide the gratings of luminous intensity shown in FIG. 1. In this preferred embodiment the phase displaced sinusoid number arrays are stored, four arrays per channel in the four refresh memories 212–218 making a total of 16 stored number arrays. Each of these arrays contain 256×256 words of modulus $2^8$ or 256; each of these words controls the intensity level of a pixel on the display 246 or 100 between the darkest and lightest possible value. These 256×256 word arrays are expandable by operator command into the full 512×512 pixel capability of the display 246 by way of the electronic zoom circuits shown at 226. The operation of electronic zoom circuits is known in the art and generally involves the displaying of data representing each pixel in the display more than one time so that a larger final image results.

The numerical contents of three of the 16 number arrays used in the preferred embodiment are shown in abbreviated form in Tables I, II and III of this specification. These tables represent the amplitude of sinewave samples taken at 16 equally spaced intervals through a sinusoid having a minimum amplitude of zero at the 270° point, a zero crossing value of 127 at the 180° point and a peak amplitude of 255 at the 90° point. These tables are based on a desire to resolve each sinewave in a display of 16 sinewave into these 16 equal increments which are spaced at 122 and ½ degrees intervals. The 16 cycles each represented by 16 samples therefore require 256 words of memory and define one-half of a scan line on the display 246. The remaining half of the display scan line is supplied by the zoom circuits 226. The values of 0, 127 and 255 in the sinewave are selected to be conveniently storable in the modulus $2^8$ pixel element storage of the I²S processor.

The values in Table I may be computed from the mathematical relation $$V = 127 + 128 \sin (22.5)n$$

where V represents the sample value to be computed and n represents the sinusoid sample number and has a value between zero and 15. Rounding off causes the values in Tables I–III to differ slightly from the mathematical results of this calculation. The values used in the present embodiment are 0, 10, 37, 79, 127, 176, 218, 245, 255, for a 180° segment of a sinusoid. Computation of sinusoid values and arrangement of the array tables required for the preferred embodiment example can be accomplished with a suitably programmed digital computer if desired; use of the computer 200 in an off-line preliminary computation is one possibility for accomplishing such computations.

Each of the 65.536 (i.e., 256×256) numerical values represented by Table I corresponds to the intensity of one pixel on the display 246 in the preferred embodiment of the invention. By way of the zoom circuits at 226 in FIG. 2., these 65,536 values are used to control the intensity at the 262,144 (i.e., 512×512) pixels of the display 246, each value in Table I therefore controls the intensity of four pixels, by way of the zoom circuits.

The numerical values in Table II and III are identical to those of Table I in the preferred embodiment but are successively phase displaced from the values in Table I by 22 and ½ degrees increments of a 360° sinusoid. In the preferred embodiment there are actually 16 arrays and 16 tables fashioned in the manner illustrated by Tables I–III; tables IV–XVI are not shown however. These tables or arrays are also stored in the refresh memories 212–218 in FIG. 2 using the arrangement of four arrays per refresh memory channel. These 16 arrays are successively accessed in the preferred embodiment to produce the motion indicated by the arrow 112. The rate of grating motion is determined by the rate at which different arrays are accessed and is controlled by the joystick 116 in the operator's control 114. This control connects to the velocity direction control 210 in FIG. 2. Reverse or regression movement of the FIG. 1A grating can be achieved by reversing the direction of array accessing. Additional details of the accessing such as the protocol for completing one array before going to the next or aborting upon operator command and also the frequency of display updating and repeat scanning needed to meet display and eye persistence requirements can be arranged to suit the desired display and the apparatus used to embody the invention.

Each column in the array of Table I contains 256 identical numerical values as is required for the generation of vertical bar patterns having the same intensity along vertical lines. The values in the columns (or rows) of Table I could be varied or modulated according to some predetermined arrangement to present a pattern having intensity variations along the vertical (or horizontal) lines of FIG. 1 or to compensate for variations in display efficiency from top to bottom (left to right) of the screen. Alternately, for embodiments using less refresh memory than in the model 70E I$^2$S processor, a repeated accessing arrangement could be used wherein the same line of an array is accessed for each successive horizontal scan to generate the constant intensity bars shown.

Figure 1B:
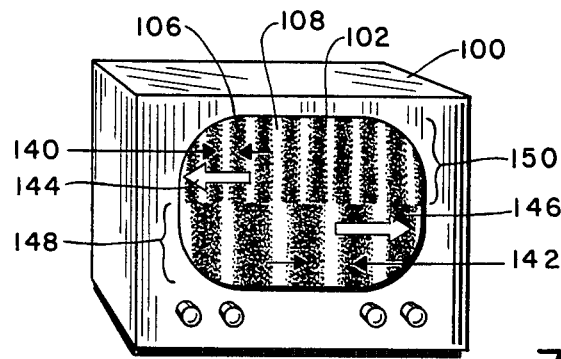
Figure 1C:
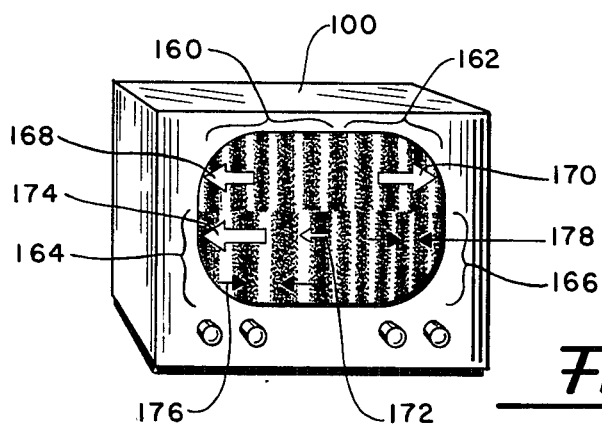

FIG. 1B illustrates an additional aspect of the invention-the display of two patterns of different spatial frequency and different movement directions on the same display. In FIG. 1B the display 100, the screen 102, the darkest and lightest displayed areas 106 and 108, and the image top half bar spacing 140 are similar to that of FIG. 1A. In the bottom half of FIG. 1B the bar spacing 142 is shown to be greater and the movement direction, indicated by the arrow 146, is shown to be opposite that of FIG. 1A. The top half grating 150 in FIG. 1B is realized in the manner described previously for the FIG. 1A grating while the bottom half grating 148 is realized by changing the values in half of the arrays stored in the refresh memories 212–218. The refresh memory channels 3 and 4 indicated at 216 and 218, for example, could contain sinusoid values of a different and slower frequency to realize the FIG. 1B bottom half grating. The bottom half grating in FIG. 1B can also be realized by accessing the same array values used for the FIG. 1A grating at a slower rate. Change of the accessing rate and use of two different accessing rates in different refresh memory channels is within the capability of the model 70E processor. FIG. 1C shows an extension of the FIG. 1B concept to gratings of different spatial frequency, different movement velocity, and also different movement direction as is indicated by the arrows 170, 172 and 174. The gratings of quadrant 1 in FIG. 1C shown at 160 are intended to be of moderate velocity as indicated by the size of the arrow 168 while those of quadrant 2 at 162 are of similar velocity but opposite movement direction, as indicated by the arrow 170. The gratings of quadrants 3 and 4 shown at 166 and 164 in FIG. 1C are of similar movement direction but of different velocity as indicated by the arrows 172 and 174. The spatial frequency of the quadrant 4 grating as shown at 176 and that of the quadrant 3 grating, as shown at 178, are different from those of the quadrant 1 and 2 gratings.

The FIG. 1C gratings are achievable by extension of the variations described for FIG. 1B wherein each of the refresh memory channels 212, 214 and 218 in FIG. 2 are loaded with arrays of differing frequency or alternately by accessing the array number values in Tables I–III at different rates and in different order.

It is possible to display the grating patterns of the preferred embodiment of the invention in variations of color rather than variations of intensity as has been described heretofore in this specification. In such an arrangement the array values, which may be generically considered to be stimulus-determining values, could be used to control one or more of the components of color, hue saturation and brightness, on a suitable color display.

It is, of course, possible to significantly reduce the amount of memory storage from that employed in the preferred embodiment of the invention by selectively repeating the use of a small number of sinusoid element numeric values from a small memory stored array. For example, the stored numeric values for grate generation could define no more than 90° or one quarter of a sinusoid if suitable sign correction and accessing sequence for generating sinusoid portions which lie after the 180 degree point are used. Phase displacement of the displayed sinusoids can also be achieved by accessing the memory stored information at points other than the first stored or zero crossing sinusoid value, i.e., by starting a moved grating with information which is stored in columns 2 or 3 or a later column of Table I rather than accessing a new array for each moved position of the grating.

As has been described, the storage of display pixel information occurs in the refresh memories 212–218 of the image array processor 206 in the preferred embodiment of the invention. In this arrangement the computer 200 serves merely to load the refresh memories and to control the operation of the array processor 206 and can be replaced by special purpose digital hardware in an alternate embodiment of the invention. The architecture of the selected image array processor is determinative of the hardware or software required for the computer's control function. International Imaging Systems Incorporated (I$^2$S) for example sells an operating system software package identified as "System 500" which is suitable for controlling the I$^2$S Model 70E processor. The "System 500" package in turn uses several subroutines which are collectively identified as "primitives"

for controlling individual functions within the Model 70E processor such as the zoom and split screen functions.

Another operating system software package which can be used with the Model 70E processor to embody the present invention is identified as "LIPS", an abbreviation for the name "Library of Image Processing Software"; this system is sold by DeAnza Systems Inc. of 118 Charcot Avenue, San Jose, Calif. 95131. Persons skilled in the programming art can also fabricate suitable operating system and subordinate software for controlling the Model 70E or other image array processors from conception or alternately can make modifications and additions to a commercially available system such as these to control the Model 70E processor.

The functions required of the Model 70E processor and its control software in the present inventions are also within the capability of persons skilled in the electronic hardware art; circuitry using RAM memory integrated circuit chips and associated logic gates could readily be used to replace both the digital computer 200 and the image array processor 206 if a general purpose computer and image array processor as in the preferred embodiment are not available.

Since the apparatus of the preferred embodiment is digital in nature it provides grating displays which are inherently stable and repeatable over a long period of time and under a variety of operating conditions. The use of a general purpose computer and a general purpose image array processing apparatus as disclosed by the preferred embodiment offers the advantage of requiring only standard available equipment which is also usable at other times for purposes other than generating grating patterns.

While the apparatus and method herein described constitutes a preferred embodiment of the invention, it is to be understood that the invention is not limited to this precise form of apparatus or method and that changes may be made therein without without departing from the scope of the invention which is defined in the appended claims.

TABLE I

| | (ARRAY 1) | | | | | | | |
|---|---|---|---|---|---|---|---|---|
| | | | | Column # | | | | |
| Row# | 1 | 2 | 3 | 4 | 5 | 6 | ... 255 | 256 |
| 1 | 128 | 176 | 218 | 245 | 255 | 245 | ... 37 | 79 |
| 2 | 128 | 176 | 218 | 245 | 255 | 245 | ... 37 | 79 |
| 3 | 128 | 176 | 218 | 245 | 255 | 245 | ... 37 | 79 |
| 4 | 128 | 176 | 218 | 245 | 255 | 245 | ... 37 | 79 |
| 5 | 128 | 176 | 218 | 245 | 255 | 245 | ... 37 | 79 |
| ... | ... | ... | ... | ... | ... | ... | ... | ... |
| 255 | 128 | 176 | 218 | 245 | 255 | 245 | ... 37 | 79 |
| 256 | 128 | 176 | 218 | 245 | 255 | 245 | ... 37 | 79 |

TABLE II

| | (ARRAY 2) | | | | | | | |
|---|---|---|---|---|---|---|---|---|
| | | | | Column # | | | | |
| Row # | 1 | 2 | 3 | 4 | 5 | 6 | ... 255 | 256 |
| 1 | 176 | 218 | 245 | 255 | 245 | 218 | ... 79 | 128 |
| 2 | 176 | 218 | 245 | 255 | 245 | 218 | ... 79 | 128 |
| 3 | 176 | 218 | 245 | 255 | 245 | 218 | ... 79 | 128 |
| 4 | 176 | 218 | 245 | 255 | 245 | 218 | ... 79 | 128 |
| 5 | 176 | 218 | 245 | 255 | 245 | 218 | ... 79 | 128 |
| ... | ... | ... | ... | ... | ... | ... | ... | ... |
| 255 | 176 | 218 | 245 | 255 | 245 | 218 | ... 79 | 128 |
| 256 | 176 | 218 | 245 | 255 | 245 | 218 | ... 79 | 128 |

TABLE III

| | (ARRAY 3) | | | | | | | |
|---|---|---|---|---|---|---|---|---|
| | | | | Column # | | | | |
| Row # | 1 | 2 | 3 | 4 | 5 | 6 | ... 255 | 256 |
| 1 | 218 | 245 | 255 | 245 | 218 | 176 | ... 128 | 176 |
| 2 | 218 | 245 | 255 | 245 | 218 | 176 | ... 128 | 176 |
| 3 | 218 | 245 | 255 | 245 | 218 | 176 | ... 128 | 176 |
| 4 | 218 | 245 | 255 | 245 | 218 | 176 | ... 128 | 176 |
| 5 | 218 | 245 | 255 | 245 | 218 | 176 | ... 128 | 176 |
| ... | ... | ... | ... | ... | ... | ... | ... | ... |
| 255 | 218 | 245 | 255 | 245 | 218 | 176 | ... 128 | 176 |
| 256 | 218 | 245 | 255 | 245 | 218 | 176 | ... 128 | 176 |

We claim:

1. A method for generating a moving grate of sinusoidal luminance modulated patterns comprising the steps of:
    computing a first array of sinusoid amplitude numeric values, the computed values defining between ¼ and N integral sinusoid cycles;
    generating a plurality of additional sinusoid numeric value arrays each similar to said first array and each containing numeric values phase displaced from said first and succeeding arrays by predetermined increments of sinusoid phase;
    storing said arrays in incrementally accessible predetermined order;
    reading a stored array in synchronism with scanning a luminance modulated display, array element value controlling display luminance at each display pixel;
    repeating the reading of each array in predetermined element order forward or backward to form a grate display of luminance sinusoids;
    applying predetermined sign correction to read array elements when required to define negative sinusoid portions;
    continuing the repeated reading for a duration selected in response to desired display and eye persistence;
    incrementing and decrementing the array reading to succeeding and preceding arrays in storage in response to luminance grate forward and reverse movement requirements, the rate of incrementing determining the rate of luminance sinusoid grate movement.

2. The method of claim 1 wherein said arrays each define at least one integral sinusoid and said predetermined sign correction is constant and nonvarying over each array.

3. The method of claim 2 wherein said predetermined increment of sinusoidal phase is between one-fourth and one-thirty-sixth of a sinusoid.

4. The method of claim 3 wherein said predetermined increment is one-sixteenth of a sinusoid.

5. A method for generating movable grate of visual stimulus patterns for predetermined modulation waveform and incremented movement ability on a scan fabrication display comprising the steps of:
    computing a first two-dimensional array of predetermined waveform amplitude values, said array having constant numeric values along a first axis and said waveform amplitude numeric values along the second axis thereof and being of predetermined waveform phase resolution and waveform cycle content;
    generating second and subsequent arrays of numeric values one for each said increment of waveform phase resolution, each said generated array being similar to said first array and including numeric values successively phase displaced from said first array values by predetermined said increments of waveform phase;

storing said numeric value arrays in predetermined access order arrangement;

accessing said array stored numeric values in synchronism with display scanning, array numeric values respectively controlling display stimuli at each scanned pixel; and incrementing, decrementing and repeating said array numeric value accessing to succeeding, preceding and presently accessed arrays in accordance with rates determined by eye persistence and an operator grate movement control signal.

6. The method of claim 5 further including the steps of:

accessing a first sequence of said arrays in synchronism with scanning a first split screen portion of said display; and reading a second sequence of said arrays in synchronism with scanning a second split screen portion of said display;

the incrementing and decrementing rates of said accessing and reading steps and the resulting display grates being independently operator controllable.

7. The method of claim 5 further including the step of repeating the accessing of each said numeric value in said arrays in synchronism with scanning plural adjacent display pixels, plural display pixels being thereby of the same array value determined visual stimulus.

8. The method of claim 7 wherein said visual stimulus includes variations in at least one of the color attributes of hue, saturation and brightness.

9. The method of claim 8 wherein said predetermined modulation waveform is a sinusoid.

10. The method of claim 9 wherein said numeric arrays include numeric values modified in accordance with a second predetermined modulation pattern.

11. The method of claim 10 wherein said second modulation pattern modification is disposed along said constant value first axis in said array.

12. The method of claim 11 wherein said waveform cycle content is comprised of a fractional waveform cycle and wherein said accessing step includes accessing said fractional waveform cycle numeric values in both the forward and backward directions.

* * * * *